(12) United States Patent
Cebeci et al.

(10) Patent No.: US 12,345,364 B2
(45) Date of Patent: Jul. 1, 2025

(54) COUPLING FOR DOUBLE-WALLED HOSES

(71) Applicant: Danfoss Power Solutions II Technology A/S, Nordborg (DK)

(72) Inventors: Okan Cebeci, Çorlu (TR); Erhan Aptiogullari, Kapakli (TR); Recep Can, Kapakli (TR); Recep Muco, Kapakli (TR); Özgür Caliskan, Kapakli (TR)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 0 days.

(21) Appl. No.: 18/454,294

(22) Filed: Aug. 23, 2023

(65) Prior Publication Data

US 2024/0068613 A1    Feb. 29, 2024

(30) Foreign Application Priority Data

Aug. 24, 2022  (EP) ..................................... 22191988

(51) Int. Cl.
*F16L 39/00* (2006.01)
*F16L 33/207* (2006.01)
*F16L 39/02* (2006.01)

(52) U.S. Cl.
CPC ......... *F16L 39/005* (2013.01); *F16L 33/2076* (2013.01); *F16L 39/02* (2013.01)

(58) Field of Classification Search
CPC ......... F16L 39/005; F16L 39/02; F16L 33/01; F16L 33/2071; F16L 33/2076
See application file for complete search history.

(56) References Cited

U.S. PATENT DOCUMENTS 4,922,971 A * 5/1990 Grantham ............... F16L 39/02
5,285,744 A * 2/1994 Grantham ............. F16L 39/005
(Continued)

FOREIGN PATENT DOCUMENTS

WO        0242672 A2    5/2002

*Primary Examiner* — William S. Choi
(74) *Attorney, Agent, or Firm* — McCormick, Paulding & Huber PLLC (57) ABSTRACT

An arrangement (1, 2) of a coupling (3) and a double-walled tube or hose (4). The double-walled tube or hose (4) includes two coaxially arranged sheaths (5, 6). The coupling (3) includes: a first, inner sleeve (14), surrounding an inner fluid conduit (7) for transfer of a first fluid, wherein the inner fluid conduit (7) is configured to fluidly connect with the fluid conduit (7) formed by the first, inner sheath (14) of the flexible tube or hose (4); a second sleeve (15), surrounding the first, inner sleeve (14); a third sleeve (16), surrounding the second sleeve (15); and a fourth, outer sleeve (17), surrounding the third sleeve (16). The first (14) and the second (15) sleeve form a receiving space (27) for receiving the first, inner sheath (5) of an end (13) of the double-walled flexible tube or hose (4); the third (16) and fourth (17) sleeve form a receiving space (28) for receiving an end (13) of a second, outer sheath (6) of the double-walled flexible tube or hose (4); and the second (15) and third (16) sleeve form an outer fluid conduit (23) for transfer of a second fluid, wherein the outer fluid conduit (23) is configured to fluidly connect with the fluid conduit formed by the clearance (8) between the first, inner (5) and the second, outer sheath (6) of the double-walled flexible tube or hose (4). The fluid connector part (19) of the inner fluid conduit (7) of the coupling (3) and the fluid connector part (25) of the outer fluid conduit (23) of the coupling (3) are displaced from each other in an axial direction of the coupling (3).

20 Claims, 3 Drawing Sheets

(56) References Cited

U.S. PATENT DOCUMENTS

| | | | | |
|---|---|---|---|---|
| 6,682,102 B1* | 1/2004 | Betz | ............... | F16L 39/005 |
| 7,000,644 B2* | 2/2006 | Ichimura | ............... | F16L 39/005 |
| 7,427,084 B1* | 9/2008 | Betz | ............... | F16L 39/02 |
| 8,308,200 B1* | 11/2012 | Barnes | ............... | F16L 39/005 |
| 8,602,056 B2* | 12/2013 | Schutz | | |
| 8,820,794 B1* | 9/2014 | Betz | ............... | F16L 39/02 |
| 9,797,529 B2* | 10/2017 | Knotten | ............... | F16L 33/01 |
| 10,794,522 B2 | 10/2020 | Shamkhi | | |
| 10,900,598 B2 | 1/2021 | Baldwin et al. | | |
| 2012/0234424 A1* | 9/2012 | Bernhardt | | |

* cited by examiner

COUPLING FOR DOUBLE-WALLED HOSES

CROSS-REFERENCE TO RELATED APPLICATION

This application claims foreign priority benefits under 35 U.S.C. § 119 from European Patent Application No. 22191988.9, filed Aug. 24, 2022, the content of which is hereby incorporated by reference in its entirety.

TECHNICAL FIELD

The invention relates to a coupling for use with a double-walled, tube or hose comprising two coaxially arranged sheaths. The invention further relates to a double-walled tube or hose arrangement. Even further, the invention relates to uses for such couplings or double-walled tube or hose arrangements.

BACKGROUND

Fluids have to be transported between different locations frequently. In the present context, the notion "fluid" can relate to gases, liquids, a mixture of gases and liquids, and also to hypercritical fluids, where a distinction between the liquidous phase and the gaseous phase cannot be made any more. It is further possible that the fluid may contain solid particles, including the case, where solid particles are conveyed using fluids as a transporting agent, or even solid particles that are transported as such, in particular using gravity.

The transport of a fluid (possibly including solids) can be necessary when fluid has to be transferred from one device to another, where the two devices are distinct from each other. An example for this would be the filling of a tank (for example the tank of a vehicle) out of a reservoir (for example an underground tank of a petrol station).

However, flexible tubes and hoses are also used when it comes to movements of fluids inside of a machinery, where this machinery can be a chemical plant, a machine tool, an engine, a vehicle, a hydraulic device, and so on, just to name a few examples out of a plethora of possibilities.

In any case, due to the finite size of machinery and thus of the distances to be bridged by the flexible tubes or hoses, and also due to the finite lengths of flexible tubes and hoses, the end(s) of the flexible tube/hose has (have) to be fluidly connected to an appropriate device, or to a consecutive flexible tube or hose, to hand over the transported fluid.

To simplify the attachment of the tube/hose to a respective device, usually couplings are used at one or both ends of the tube or hose. The attachment of the respective coupling can be realised by the manufacturer of the tube or hose, or by a specialised manufacturer. Then, it is possible to use comparatively complex, time-consuming and/or difficult-to-perform techniques, and/or techniques that necessitate the use of special tools. Therefore, an increased effort can be made to realise a durable and fluid tight connection between the tube or hose and the respective coupling.

At the site where the connector-hose-arrangement is used (for example when assembling a hydraulic arrangement, a vehicle and so on), thanks to the coupling a comparatively simple fluid connection between the respective device and the hose (namely the coupling) can be realised that is nevertheless free of leaks and that is durable.

Since, as already mentioned, the transfer of liquids is a task that hat to be realized frequently in essentially all fields of technology, it is not surprising that already a vast amount of couplings has been proposed. Just to name a few examples: WO 0242672 A2 proposes a coupling with an end fitting for use with a flexible pipe or hose that is intended for a high pressure service. The coupling comprises an inner and an outer sleeve between which an end of the hose or pipe is to be disposed and secured. The coupling is usable for single walled tubes or hoses with a single fluid channel.

When particularly high temperatures and pressures are in question, U.S. Ser. No. 10/900,598 B2 suggests a labyrinth seal swage coupling for a high temperature/pressure reinforced rubber hose. The hose coupling includes a stem having first hose grippers extending from and along the length of the outer surface; elastomeric sealing members located around and disposed along the length of the outer surface of the stem; and a ferrule attached to the stem adjacent ensuring a labyrinth seal between the inner tube and the hose coupling. Again, the coupling is usable for single walled hoses or tubes with a single fluid channel.

In certain cases of operation, however, it is necessary to use double-walled tubes or hoses. This may be even a legal requirement for example for conveying dangerous fluids. In case the inner, main fluid conduit, as defined by the inner sheath of the double-walled tube or fluid breaks or becomes leaky, the respective fluid will enter the annular conduit, defined by the clearance between the inner and the outer sheath of the double-walled tube or hose, so that the fluid is still contained by the second, outer sheath of the double-walled hose or tube. It is even possible to use detectors or sensors, where a detection of a presence of the respective fluid in the clearance between the inner and outer sheath of the tube/hose is an indication that the inner fluid conduit became leaky and that consequently certain measures have to be performed, like a safety shutdown.

It is to be noted that the "level of dangerousness" may relate to a very wide interval. As an example, the "dangerous fluid" can be a toxic fluid, where its release into the surroundings has to be positively avoided. Also, the "dangerous fluid" may relate to a fuel in a vehicle, ship or aeroplane, where a release of the fuel may lead to a (significantly) increased level of fire hazard. However, the "dangerous fluid" may relate even to water: an example for this is a dishwasher or a washing machine, where a leak or rupture of the water feeding hose has to be detected (and a safety valve to be closed) to avoid consequent water damage of the room, the dishwasher or washing machine is placed in. This is widely realised by using a double-walled hose and a water sensor that fluidly connects to the clearance between the inner and the outer sheath of the double-walled water feeding hose.

It is understandable that even for double-walled hoses, methods for connecting two ends of double-walled hoses have already been suggested, since hoses are only of a finite length. An example for this is described in U.S. Ser. No. 10/794,522 B2, where a flexible conduit for transporting fluids in a fluid system, such as a fluid system of an aircraft, is proposed. The flexible conduit can include a flexible inner hose for transporting a fluid. The flexible hose can be surrounded by a flexible outer wall which can contain any leakage of fluid from the flexible inner hose. The flexible inner hose and the flexible outer hose can be coupled on each end to ferrules. Swage rings can be swaged to secure the flexible inner hose and the flexible outer hose to the ferrules.

However, present-day solutions for couplings of tubes or hoses, in particular of double-walled tubes or hoses are still deficient. In particular, they are frequently cumbersome to realise and/or to attach to the double-walled tube or hose and/or to a device, the tube or hose has to be connected to.

Furthermore, they are frequently quite expensive and show a somewhat limited durability.

Therefore, there is still room for further improvements.

SUMMARY

It is therefore an object of the present invention to suggest a coupling for use with a double-walled tube or hose comprising two coaxially arranged sheaths, that is improved over couplings for use with a double-walled tube or hose that are known in the state of the art.

It is another object of the present suggestion to suggest a double-walled tube or hose arrangement, comprising a double-walled tube or hose and a coupling, that is improved over double-walled tube or hose arrangements that is known in the state of the art.

Yet another object of the invention is to suggest suitable uses for couplings for double-walled tubes or hoses and/or for double-walled tube or hose arrangements that are improved over uses that are known in the state-of-the-art.

A coupling for use with a double-walled tube or hose and/or an arrangement comprising a double-walled tube or hose and a coupling and/or a use for a coupling for double-walled tubes or hoses and/or a use for an arrangement comprising a double-walled tube or hose and a coupling according to the present disclosure solves these objects.

It is therefore suggested to design a coupling for use with a double-walled tube or hose, the double-walled tube or hose comprising two coaxially arranged sheaths, the coupling comprising: a first, inner sleeve, surrounding an inner fluid conduit for transfer of a first fluid, wherein the inner fluid conduit is configured to fluidly connect with the fluid conduit formed by the first, inner sheath of the tube or hose; a second sleeve, surrounding the first, inner sleeve; a third sleeve, surrounding the second sleeve; a fourth, outer sleeve, surrounding the third sleeve; wherein the first and the second sleeve form a receiving space for receiving the first, inner sheath of an end of the double-walled tube or hose; wherein the third and fourth sleeve form a receiving space for receiving an end of a second, outer sheath of the double-walled tube or hose; wherein further the second and third sleeve form an outer fluid conduit for transfer of a second fluid, wherein the outer fluid conduit is configured to fluidly connect with the fluid conduit formed by the clearance between the first, inner sheath and the second, outer sheath of the double-walled tube or hose in a way that the fluid connector part of the inner fluid conduit of the coupling and the fluid connector part of the outer fluid conduit of the coupling are displaced from each other in an axial direction of the coupling. The coupling is mainly intended to be used for connecting the double-walled tube or hose to a device that is different from a tube or hose. In other words, the coupling is usually not meant to be used as a coupling device for connecting the tube or hose to another tube or hose (forming some kind of an "extension tube/hose"; which may include a "changeover" from a tube to a hose or vice versa). Rather, the coupling is intended to be used for connecting a double-walled tube or hose with a device like a hydraulic piston, a tank, a reactor, an engine, a fluid pump, a fluid motor or the like (where it is stressed that the expressly named devices are only a very limited exemplary number of possible devices out of a vast number of possible devices). The tube and/or the hose may be at least partially flexible. In particular, the coupling is usually used in a way that the connection between the coupling and the double-walled tube or hose is established for extended periods of times, generally even (essentially) permanent. This, of course may imply that the establishment of the connection between the coupling and the double-walled tube or hose may be relatively complex, may need special skills, may need special processing, and may need the use of specialised tools that are not readily around, in particular not readily around in normal workshops or the like. Indeed, it may be preferred that the connection between the coupling and the double-walled tube or hose is established at the manufacturing site of the coupling/at the manufacturing site of the double-walled tube or hose, or at a specialised assembly site or a specialised workshop. Contrary to the usually essentially permanent connection of the coupling with the double-walled tube or hose, the connection of the coupling with an appropriate device may be made at a site that is not specialised for creating elaborate connections. Just to name an example, such a connection may be made at a repair shop for vehicles, at a manufacturing site of a hydraulic arrangement, when servicing a hydraulic arrangement, at a chemical plant when servicing the chemical production arrangement and the like. In particular, this may include the possibility that the coupling is (temporarily) disconnected from its respective device for performing standard maintenance or repair tasks of the arrangement (possibly including a reattachment of the coupling to the respective device afterwards). Put in other words: the coupling and the double-walled tube or hose may be used as an integral device that is usually sold, stored and used as a common, separately handable device.

The various parts of the coupling may be provided as separate parts. However, as suggested in the following, some of the parts of the coupling, in particular some of the sleeves, even more particular the second and the third sleeve, may be provided as a common part, even more preferably as a single piece part. The material of the coupling and/or of the various sleeves may be chosen according to the individual needs. In particular, a thermoplastic material may be used like PET (polyethylene), PU (polyurethane), PVC (polyvinyl chloride), PP (polypropylene) or the like. However, materials like metal, in particular steel, copper, ceramics, sintered materials or the like may be used as well. It is to be noted that the various parts of the coupling may be made of the same material, or may be made of different materials. As an example: first and fourth sleeve may be made of steel (so that they can be swaged), while second and third sleeve may be made of a thermoplastic material or may be made of a ceramic material (certainly, steel is possible for the second and/or third sleeve as well). As already mentioned, some parts of the coupling may be provided as a common device, where this may mean that the respective parts are fixedly attached to each other. However, it is also possible that the respective parts show a certain play (at least initially) and are for example snap-fit together so that one cannot easily lose some of the parts; but nevertheless, a certain movability of the respective part with respect to one or more of the other parts is possible. This may particularly relate to a state, where the coupling is not yet attached to the double-walled tube or hose. In particular, if the double-walled tube or hose is attached to the coupling, normally the respective parts (usually including the respective end part of the double-walled tube or hose) form a more or less solid compound with respect to each other.

The notion "sleeve" may mean that the respective sleeve shows an essentially smooth surface on at least one of its main surfaces. However, it is usually preferred if at least one, typically only one of the main surfaces of the respective sleeve shows a surface structure that works as some structure that inhibits a relative movement of the sheath of the double-walled tube or hose and the respective surface of the respective sleeve (or the compound of two or more sleeves, in particular the compound of the second and the third sleeve). Further, the radial dimension (size/diameter) may be essentially the same along the axial extent (length as seen in the axial direction) of the respective part. This may particularly relate to sections of the respective part of the coupling that relate to sections in the axial direction in which the sheaths of the double-walled tube or hose are to be placed. However, it is also possible that the radial extent of the respective part varies. This may particularly relate to an axial section, in which the sheath of the double-walled tube or hose are not nearby in a fully assembled state of the coupling and the corresponding double-walled tube or hose. This may also relate to a part (in particular sleeve) in the axial direction, where in the fully assembled state an end of the sheaths of the double-walled tube or hose is close by (for example near the last 1 cm, last 2 cm, last 3 cm, last 4 cm last 5 cm of at least one of the sheaths of the double-walled tube or hose.

The first, inner sleeve may be configured to fluidly connect with a fluid conduit formed by the first, inner sheath of the double-walled tube or hose and surrounds an inner fluid conduit for transfer of a first fluid. In other words, the inner fluid conduit of the first, inner sleeve is an extension of the fluid conduit that is formed by the first, inner sheath of the double-walled tube or hose. This does not exclude the possibility that certain variations of the diameter of the respective inner fluid conduit (i.e. of the first, inner sleeve and/or the inner sheath of the flexible tube or hose) may change to a certain extent of usually up to 2%, 5%, 7.5% or 10%. The change may particularly occur at a changeover point, where a material change occurs (i.e.—as seen from the inside—where the fluid containing wall changes from the inner sheath of the double-walled tube or hose to the first, inner sleeve of the coupling. Further, another variation of the diameter may occur at an end of the coupling that is distant from the double-walled tube or hose. This may relate to a part, where—as seen in the axial direction—the sheath of the double-walled tube or hose is no longer present, or to an area that lies in the vicinity of the end of the respective sheaths of the double-walled tube or hose.

It is to be noted that the dimensions of the coupling prior to assembly with the double-walled tube or hose and after the assembly with the double-walled tube or hose may be different. For example, this may be caused by certain connecting techniques between the coupling and the double-walled tube or hose, for example if swaging deformations or crimping deformations of one, two or several sleeves are made for establishing a fixation of the sheaths of the double-walled tube or hose to the coupling/the respective sleeves of the coupling.

The inner fluid conduit of the first, inner sleeve may be seen as a—so to say—continuation of the fluid conduit formed by the first, inner sheath of the tube or hose, the coupling is intended to be connected to. Similarly, the outer fluid conduit can be seen as a—so to say—continuation of an annular fluid channel that is formed by the second and third sleeve of the coupling (clearance between the first and second sheath of the double-walled tube or hose, the coupling is intended to be connected to). In particular in the latter case (outer fluid conduit), it is usually not possible to completely avoid a change of the overall cross-section for fluid flow that is available by the clearance that is formed by the sheaths of the double-walled tube or hose and that is available between the respective sleeves of the coupling. Nevertheless, usually a more than sufficient cross section can be maintained, so that a good fluid throughput rate through the outer fluid conduit of the coupling, and/or through the fluid conduit that is formed by the clearance between the sheaths of the double-walled tube or hose can be maintained. Usually, the cross section of the outer fluid conduit of the coupling (usually located between the second and the third sleeve) is somewhat smaller than the cross section of the clearance between the sheaths of the double-walled tube or hose. Only for completeness one should mention that depending on how the clearance between the sheaths of the double-walled tube or hose is maintained, it is also possible that the overall available cross-section for fluid transfer may be approximately the same or maybe even larger in the outer fluid conduit between the second and third sleeve of the coupling.

The receiving space formed by the first and second sleeve and/or the receiving space formed by the third and fourth sleeve of the coupling may be comparatively large prior to assembly of the double-walled tube or hose and the coupling. In particular, the inner sheath of the double-walled tube or hose may be of approximately the same thickness, or may be slightly thinner than the receiving space between the first and second sleeve and/or the thickness of the outer sheath of the double-walled tube or hose may be approximately the same or may be slightly thinner than the thickness of the receiving space between the third and fourth sleeve of the coupling. This way, the end of the double-walled tube or hose may be inserted comparatively easily into the respective receiving spaces of the coupling. After insertion of the end(s) of the double-walled tube or hose, a connection between the coupling and the double-walled tube or hose may be realised by connection techniques, as they are known in the state of the art, for example using glue, deformation techniques (in particular swaging, crimping, clamping), and the like. Further, it is possible that sealings are provided between one, two, three, four or even more interfaces between the surfaces of the sleeves and the surfaces of the sheaths of the double-walled tube or hose to increase the fluid tightness of the arrangement.

By using an axial displacement between the outlets of the respective fluid conduits (i.e. inner fluid conduit of the coupling and outer fluid conduit of the coupling), it is usually significantly easier to mount the coupling to a respective device. In particular, it is possible to use two separate (in particular in time; additionally or alternatively a different type of) attachment process steps and it is even possible to connect the coupling to two different devices or two different subparts of the device, to which the coupling is to be connected. Surprisingly, this significantly increases the handability and the versatility of coupling.

As a "fluid connector part" of the inner fluid conduit and/or of the outer fluid conduit, essentially all arrangements that are known in the state of the art may be used. As an example, a direct connection of the inner fluid conduit of the coupling to an appropriately dimensioned hole in a surface of a device may be used. Also, a fluid connector part may be used as a hose fitting (male hose connector; nozzle-type fluid connector), a hose coupling (female hose connector; socket-type fluid connector), an orifice with a thread or the like. In particular, attention is drawn to the fact that thanks to the presently suggested design it is very easy to design the fluid connector parts (fluid connector part of the inner fluid conduit and fluid connector part of outer fluid conduit of the coupling) using the same fluid connection arrangement, or using different fluid connection arrangements. Therefore, the presently proposed coupling can be very easily adapted to a large amount of different specifications.

Only for completeness it should be mentioned that it is of course possible that two, three or a plurality of fluid connectors may be provided, in particular for the outer fluid conduit.

While the cross-sectional shape of the fluid conduits of the inner fluid conduit and the outer fluid conduit of the coupling and/or of the inner fluid conduit and the outer fluid conduit of the double-walled tube or hose may be taken from all available shapes, it is usually preferred to use circular or possibly elliptical shapes due to pressure stability considerations. However, rectangular or polygonal shapes may be envisaged as well (possibly comprising rounded edges). Of course, for the outer fluid conduit a "circular shape" has usually to be interpreted as a ring-like shape for geometrical reasons (the same is true for all other possible shapes in analogy). In particular, with respect to the outer fluid conduit of the coupling, the shape may relate to a—so to say—"basic shape". As an example, when talking about a circular (or a ringlike) basic shape of the outer fluid conduit, the basic ring-like structure may be realised by an arrangement of individual channels that are arranged side-by-side in a ring-like form. The individual channels, however, may show a different shape, for example a circular, elliptical, rectangular, quadratic or ring segment like shape.

In particular, it is proposed to design the coupling in a way that the fluid connector part of the outer fluid conduit is arranged at an angle relative to the axial direction of the coupling and/or to the axial direction of the fluid connector part of the inner fluid conduit. In particular, the direction of the fluid connector part of the outer fluid conduit may be defined by its axial direction. "Axial direction" (relating to the outer fluid conduit, the coupling and/or the inner fluid conduit) may particularly relate to the direction of fluid flow when fluid flows through the respective part, in particular according to the intended use and/or when using typical design specifications, in particular when a typical fluid flow throughput is established through the respective part of the coupling. In particular, the relative angle between the fluid connector part of the outer fluid conduit and the axial direction of the fluid connector part of the inner fluid conduit and/or of the coupling, may lie in a range between 10°, 20°, 30°, 40°, 45°, 50°, 60°, 70°, 80°, 90°, 100°, 110°, 120°, 130°, 135°, 140°, 150° and 160° (lower limit) and 20°, 30°, 45°, 50°, 60°, 70°, 80°, 90°, 100° 110°, 120°, 130°, 135°, 140°, 150°, 160° and 170° (upper limit). In particular, the angle may be essentially a right angle, i.e. the angle may be 90° (a variation of −5°, −10° or −15° and/or +5°, +10° or +15° may be envisaged as well).

It is further suggested to design the coupling in a way that the fluid connector part of the inner fluid conduit is designed as a front-end fluid connector part, preferably comprising a flange part. This way, the coupling can be easily attached to a wall with a hole for fluid throughput. Usually, the size of the hole in the wall and the size of the inner fluid conduit should be approximately the same (which may include the geometrical shapes as well). Such a type of device is quite common in present-day technology, for example when it comes to fluid tanks, chemical reactors or the like. A "wall with a whole" may also relate to an opposing flange part, to which the coupling may be attached.

It is further suggested to design the coupling in a way that the fluid connector part of the outer fluid conduit is designed as a nozzle-type fluid connector part and/or as a socket-type fluid connector part. This way, it is particularly simple to establish a fluid connection with a tube or hose (where usually the fluid flow cross-section may be of approximately the same dimension, as the fluid flow cross-section of the clearance between the two sheaths of the double-walled tube or hose. This way, for example leakage fluid from the inner fluid conduit of the double-walled tube or hose can be contained and/or conveyed. Furthermore, the outer fluid conduit of the double-walled tube or hose can be easily used for heat exchanging purposes or the like. The connection between the fluid connector part of the coupling and the hose/tube to be attached to said fluid connector part can be realised using all available connection techniques that are known in the state of the art, in particular using threads, using crimping techniques, using clips, clamping techniques or swaging techniques, just to name some examples.

Furthermore, it is suggested to design the coupling in a way that the outer fluid conduit of the coupling comprises a plurality of fluid channels that are preferably arranged along the circumference of the outer fluid conduit of the coupling. Additionally or alternatively it is suggested that the coupling is designed in a way that the second and third sleeve of the coupling are connected to each other by a plurality of web-like connections. This way, the mechanical stability of the coupling, in particular the mechanical stability of the outer fluid conduit of the coupling can be secured using very simple techniques. As already mentioned, the fluid channels of the plurality of fluid channels of the outer fluid conduit may show a cross-section that is different from the "basic shape" of the outer fluid conduit. In particular, the shapes of the individual fluid channels may be quadratic, rectangular, circular, ellipsoidal or ring segment-like (possibly showing rounded corners). It is to be noted that the shape may be the same for the individual fluid channels, or that the shape varies between fluid channels. In particular, it is possible to provide different subgroups of fluid channels, each subgroup showing a certain cross-sectional shape for the individual fluid channel.

It is further suggested to design the coupling in a way that it comprises a collection channel that fluidly connects to the fluid connector part of the outer fluid channel and/or the plurality of fluid channels of the outer fluid conduit. This way, it is easily possible to "convert" an annular shaped/ring-shaped fluid channel into a standard circular channel of a tube/house. In particular, the annular arrangement of the individual fluid channels/the ring-like arrangement of the individual fluid channels (forming the outer fluid channel of the coupling) that connect to the collecting channel is due to the design of the double-walled tube or hose comprising a clearance between its inner and outer sheath. The standard circular tube/hose design, however, is a design that is so common that the acceptance of the presently suggested design may be high. In particular, the collection channel can show an essentially ring like design.

Furthermore, it is suggested to design the coupling in a way that the second and third sleeve of the coupling are designed as a common part, in particular as a one-piece part. This way, it is particularly simple to realise a viable design of the outer fluid channel of the coupling. In particular, this suggestion is also helpful in maintaining a sufficiently large size of the available fluid flow cross-section of the outer fluid conduit and/or of the outer fluid flow channel(s).

Even further, it is suggested to design the coupling in a way that it comprises an anti-kink protection device that is arranged at least in part in the vicinity, preferably connected to the second and/or third sleeve of the coupling and/or that is designed to be arranged in the spacing between the inner and the outer sheath of the double-walled tube or hose. This way, a kink of the double-walled tube or hose in the vicinity of the coupling (a location at which it is quite common that tubes and hoses are prone to develop kinks) can be easily avoided. It is understandable that kinks have to be avoided since they would adversely influence the fluid flow throughput behaviour of the coupling/double-walled tube or hose. Furthermore, kinks would induce a significantly increased wear, which is of course undesired as well.

In particular, it is suggested that the anti-kink protection device is designed as one, two or plurality of spirals or springs lying at least in part in the vicinity of, preferably extending from the second and/or third sleeve of the coupling. First experiments have shown that this is a particularly suitable design that can be realised with comparatively little effort, and that nevertheless yields a big improvement. Furthermore, the fluid flow behaviour is usually not significantly hindered by the proposed design.

It is to be noted that it is in principle also possible that the anti-kink device is arranged at least in part in the vicinity (or is even connected to) the first and/or the fourth sleeve in addition or alternatively to the second and/or third sleeve. However, when placing the anti-kink device in the vicinity of the second and/or third sleeve and/or in the spacing between the inner and the outer sheath of the double-walled tube or hose, the anti-kink device is particularly protected from external influences.

It is further suggested to design the coupling in a way that the first sleeve, the second sleeve, the third sleeve and/or the fourth sleeve comprise a latching teeth arrangement, in particular a sawtooth-like latching teeth arrangement. This way, the stability of the connection between the coupling and the sheaths of the double-walled tube or hose can be particularly high. Therefore, the coupling is usable for high pressures and/or has a particularly long lifetime. Furthermore, usually the latching teeth arrangement even shows some sealing behaviour since the teeth arrangement usually effectively acts as a lamella type sealing. Such an increased tightness is of course advantageous as well.

Furthermore, it is suggested to design the coupling in a way that it comprises at least a crimping device, a clamping device and/or a swaging device. This may be understood in a way that the coupling is at least partially designed and arranged in a way that the respective part can be crimped, clamped or swaged. As an example, a swaging device can be a part of the coupling that may be swaged for effectuating a sealing and/or a good mechanical connection. A clamping device may be a clamp or even an area/surface, where a clamp may be attached to. Likewise, a crimping device may be a part of the coupling that can be easily deformed, so that a crimping connection can be established.

Even further, it is suggested to design the coupling in a way that the inner fluid conduit and the outer fluid conduit of the coupling are fluidly separated from each other. This way, a clear fluid separation can be realised, so that the outer fluid conduit and the inner fluid conduit can be used for transferring different fluids. This includes the possibility that the fluids (including, but not limited to similar or identical fluids) can show a different temperature or the like.

Furthermore, a double-walled tube or hose arrangement is suggested that comprises a double-walled tube or hose and a coupling according to the previous disclosure, wherein at least one end of the double-walled tube or hose comprises a coupling. Preferably, the coupling is provided at both ends of the double-walled flexible tube or hose. This way, a prefabricated device that can be sold and handled as a very versatile and easy to use device. In particular, such an arrangement can be used in machine shops, manufacturing sites and the like.

A use of a coupling according to the present disclosure and/or a use of a double-walled tube or hose arrangement according to the present disclosure is suggested, wherein the inner and the outer fluid conduit is used for transferring different types of fluids and/or for transferring fluids at a different temperature and/or pressure, and/or wherein the double-walled tube or hose arrangement is used for/as a safety tube or hose. Such a use of the presently suggested coupling/double-walled tube or hose arrangement is particularly suitable, since a transfer of different fluids is a frequent task in present-day technology. Furthermore, relatively frequent it is desired or even required by law to provide sufficient safety measures to avoid leakage of dangerous fluids to the environment. Another common problem is to prevent an alteration of temperature sensitive fluids, in particular if such fluids have to be transferred through a hot environment. This can be solved by using a cooling fluid in the outer fluid conduit, preventing influx of heat into the inner fluid conduit. Even further, heat exchangers are very widely used in present-day technology. When using fluids at a different temperature level for the inner and outer fluid conduit, a transfer of fluid can be combined with a heat exchanging effect, which may prove to be particularly advantageous.

DETAILED DESCRIPTION

Figure 1:
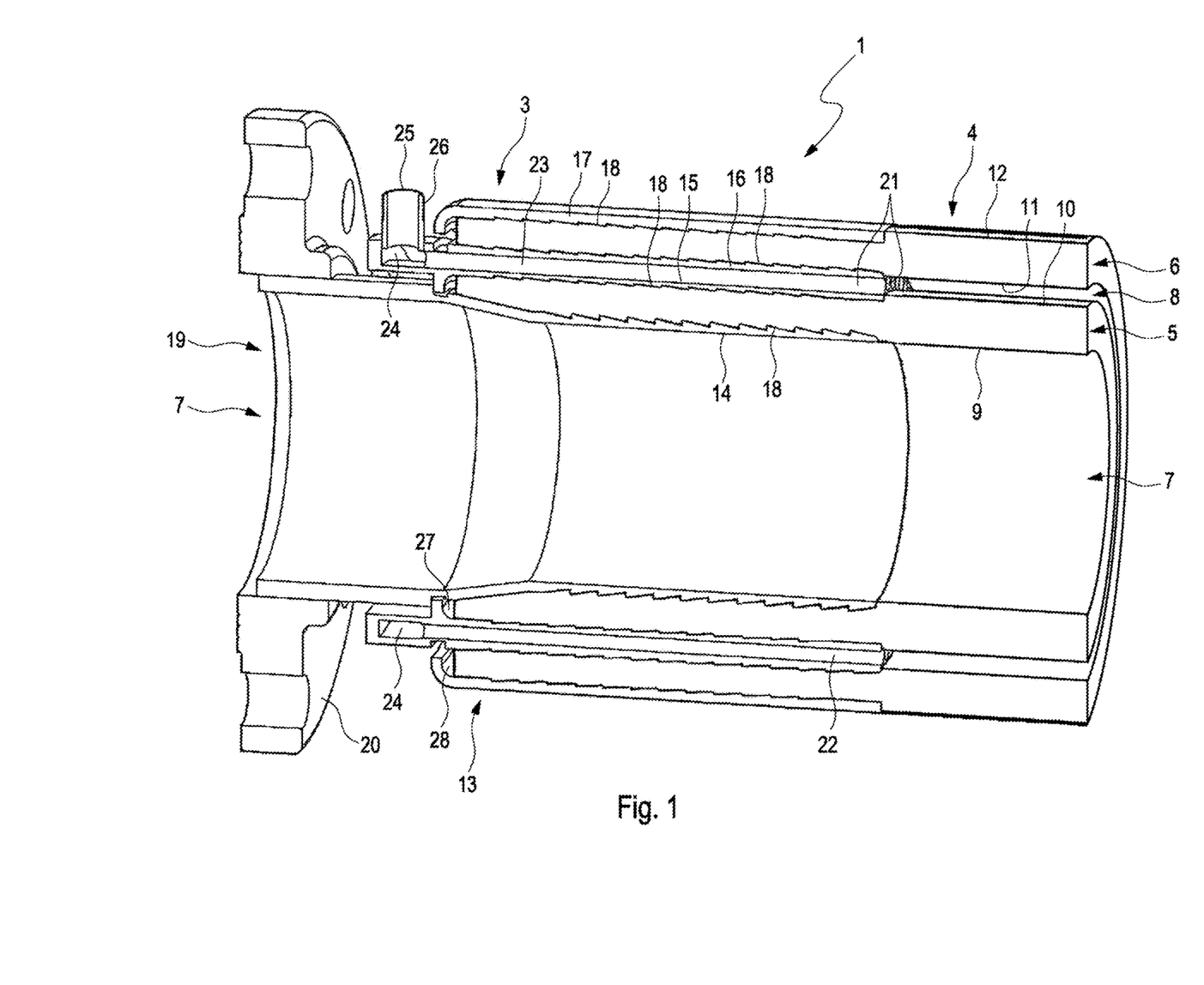
FIG. 1 shows a first embodiment of an arrangement of a double-walled hose with a coupling in a schematic perspective cross section.

FIG. 1 shows a possible embodiment of an arrangement 1 of a double-walled hose 4 with a coupling 3 according to the present disclosure in a cross-sectional perspective view. In FIG. 1, for clarity, only one end section 13 of the double-walled hose 4, together with the coupling 3 is shown. As it is known to a person skilled in the art, the double-walled hose 4 usually shows a distinct length, typically of several metres. In particular, the other end of the double-walled hose 4 may show a coupling that is similar to the presently shown coupling 3 according to FIG. 1. However, it is also possible that a different type of a coupling is used, or that no coupling is present at the other end of the double-walled hose 4.

The double-walled hose 4 comprises an inner sheath 5 and an outer sheath 6. The two sheaths 5, 6 can be made of any material that is used for this purpose in the state of the art. As an example, the inner and/or outer sheath could be produced from fibre reinforced rubber material. Possibly, a coating could be applied on one or both sides as well.

The inner sheath 5 and the outer sheath 6 of the double-walled hose 4 are arranged coaxially to each other. I.e., inner sheath 5 is arranged inside of outer sheath 6, or, put in other words, outer sheath 6 contains inner sheath 5. The dimensions of the sheaths 5, 6 are chosen in a way that an annular clearance 8 remains between the outer wall 10 of inner sheath 5 and inner wall 11 of outer sheath 6.

The inner sheath 5 defines an inner fluid conduit 7 on its inside. The inner fluid conduit 7 is limited by the inner wall 9 of inner sheath 5.

On the end 13 (which can be seen in FIG. 1) of the double-walled hose 4, a coupling 3 is arranged.

The coupling 3 essentially comprises a first, inner sleeve 14, a second sleeve 15 that surrounds first inner sleeve 15; a third sleeve 16 that surrounds second sleeve 15 (and therefore first sleeve 14 as well); and an outer, fourth sleeve 17 that surrounds the third sleeve 16 (and therefore also second sleeve 15 and first sleeve 14). The various sleeves are arranged coaxially to each other.

As can be seen from FIG. 1, the inside of inner sleeve 14 of coupling 3 defines an inner fluid conduit 7 that is a continuation of inner fluid conduit 7 of double-walled hose 4 (where for simplicity the same reference numeral is used). Further, between the outer (circumferential) wall of first, inner sleeve 14 and inner wall of second sleeve 15 an inner receiving space 27 is formed, inside of which the first, inner sleeve 5 of double-walled hose 4 is arranged. In the present embodiment, the force-fit connection between first sleeve 14, second sleeve 15 and inner sheath 5 is established by swaging first inner sleeve 14 to the outside, after the double-walled hose 4 has been placed with the respective ends of the sheaths 5 and 6 in the respective receiving spaces (first, inner receiving space 27 between first sleeve 14 and second sleeve 15; second, outer receiving space 28 between the third sleeve 16 and fourth sleeve 17).

Similarly, a force-fit connection is established between third sleeve 16 and fourth sleeve 17 and outer sheath 6 of double-walled hose 4 by a swaging and/or crimping deformation of outer, fourth sleeve 17 towards the inside.

To reinforce the connection between coupling 3 and double-walled hose 4, on the surfaces of the various sleeves 14, 15, 16, 17 that are neighbouring first and second sheath 5, 6 of the double-walled hose 4, a sawtooth like latching teeth arrangement 18 is provided. This introduces an additional positive form-locking fixation to the previously described force-fit connection.

For completeness, it should be mentioned that in the embodiment, as shown in FIG. 1 (similarly FIG. 2 and FIG. 3) both the coupling 1 (3) and the double-walled hose 4 have a circular cross-section. In principle, however, a different cross-section could be used as well, like an elliptical cross-section, a rectangular or polygonal cross-section (in particular showing rounded edges) or the like.

As can be seen from FIG. 1, the fluid connector part 19 of the inner fluid conduit 7 is essentially designed as a circular orifice 19 that is surrounded by a flange 20. As can be seen in FIG. 1, the flange 20 comprises several bores for introducing screws or the like, as it is well established in the state of the art. Using the flange 20, the coupling 1 can be firmly attached to a wall of a suitable device in a fluid tight way. If needed, a sealing can be placed between the flange 20 and the wall of the respective device, as it is also a well-established in the prior art.

As can be further seen in FIG. 1, second sleeve 15 and third sleeve 16 are presently designed as a common part (unitary piece; one-piece block). Namely, second sleeve 15 and third sleeve 16 form a block that comprises a plurality of fluid channels 21 that are separated by web-like separating walls 22. The separating walls 22 provide a sufficiently large mechanical stability of combined second 15 and third sleeve 16, and do provide a second, outer fluid channel 23. As can be seen from FIG. 1, the outer fluid channel 23 is so to say an extension of the fluid guiding annular clearance 8 that is formed by first 5 and a second 6 sheath of the double-walled hose 4.

The outer fluid channel 23 thus fluidly connects the annular clearance 8 with the circular collecting channel 24 by virtue of the plurality of fluid channels 21. Presently, the individual fluid channels 21 show a circular cross-section. However, the fluid channels 21 may show a different cross-section as well.

The collecting channel 24 collects the fluid output of (or distributes the fluid input to) the fluid channels 21 and directs the fluid output (fluid input from) to a nozzle type connector 25. Using a nozzle-type connector 25, a hose or tube can be fluidly connected. Presently, the nozzle type connector 20 is provided with an outer thread 26, so that a tube or hose can be connected in a fluid-tight way using a threaded nut.

The arrangement 1 of the double-walled hose 4 and the coupling 3 can be used for several purposes:

The double-walled hose 4 can be used as a safety hose. Here, fluid is led through the inner fluid conduit 7 (only). Only in case a leak occurs in inner sheath 5 of double-walled hose 4 (or in the end section 13 of double-walled hose 4 and coupling 3; inner receiving space of coupling 3 and inner sheath 5 of double-walled hose 4), fluid from the inner fluid conduit 7 will be present in annular clearance 8/outer fluid conduit 23 of coupling 3. In this example, a suitable sensor may be attached to nozzle-type connector 25 (either directly, or indirectly using a tube or hose), so that the sensor can detect the presence of the conveyed fluid in annular clearance 8, outer fluid channel 23/collecting channel 24. If the presence of guided fluid is detected by such a sensor, a shutdown process can be initiated or an alert signal can be displayed to an operator, just to name two possible examples. Irrespective of the "initial leak", the possibly dangerous or hazardous fluid is still contained within the double-walled hose 4, namely within the outer sheath 6 of double-walled hose 4. Therefore, no environmental hazard is present.

Another possibility is that fluid channel 7 and annular clearance 8/outer fluid channel 23 can be used for conveying two different gases separate from each other, without the necessity to install two separate tubes/hoses. This can be advantageous for several reasons. As an example, assembly cost may be reduced, assembly space may be saved or the like.

Yet another advantage is that the fluid that is channeled in the inner fluid channel 7 and the outer fluid channel 23/annular clearance 8, respectively, may show a different temperature (irrespective of whether the same or a different fluid is guided). This way, a heat exchanger effect can be realised, so that possibly the use of a heat exchanger can be avoided, or at least a still necessary heat exchanger can be dimensioned with a smaller size. The underlying idea can also be used for preventing an overheating of the fluid in the inner fluid channel 7, even if the double-walled hose 4 is guided through a hot environment, namely by using cooling fluid in annular clearance 8/outer fluid conduit 23.

Figure 2:
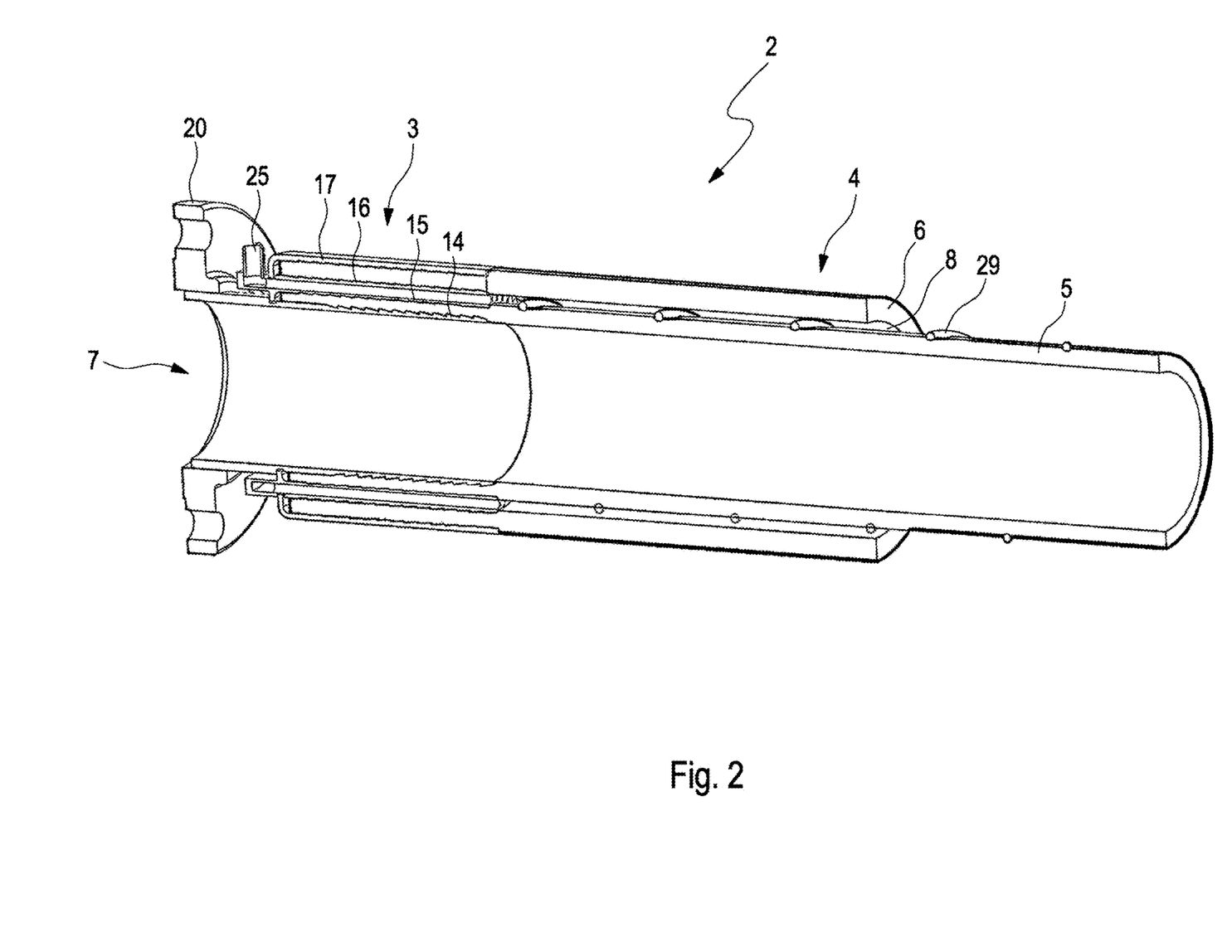
FIG. 2 shows a second embodiment of an arrangement of a double-walled hose with a coupling in a schematic perspective cross section.

The arrangement 2 of a double-walled hose 4 and a coupling 3 according to the embodiment of FIG. 2 (and FIG. 3) is very similar to the embodiment of an arrangement 1 according to FIG. 1. Therefore, for simplicity, similar reference numerals are used for the same or for at least similar parts, and reference is made to the previous description.

A major difference between the arrangement 2 according to the present embodiment versus the arrangement 1 according to the embodiment of FIG. 1 is that in the present embodiment 2 a helically wound spring 29 is introduced in the annular clearance 8 between the inner sheath 5 and outer sheath 6 of double-walled hose 4. The spring 29 is connected to the unitary block of second sleeve 15 and third sleeve 16 using a welding spot or soldering spot 30 (see FIG. 3). The spring 29 stiffens the double-walled hose 4 in the vicinity of coupling 3, so that in this section of the arrangement 2 the possibility of a kink is significantly reduced. Due to the finite length of spring 29, it is obvious for a person skilled in the art that the fluid resistance that is introduced by spring 29 is comparatively small and usually easily outweighs the disadvantages imposed by the added fluid flow resistance of the spring 29.

Figure 3:
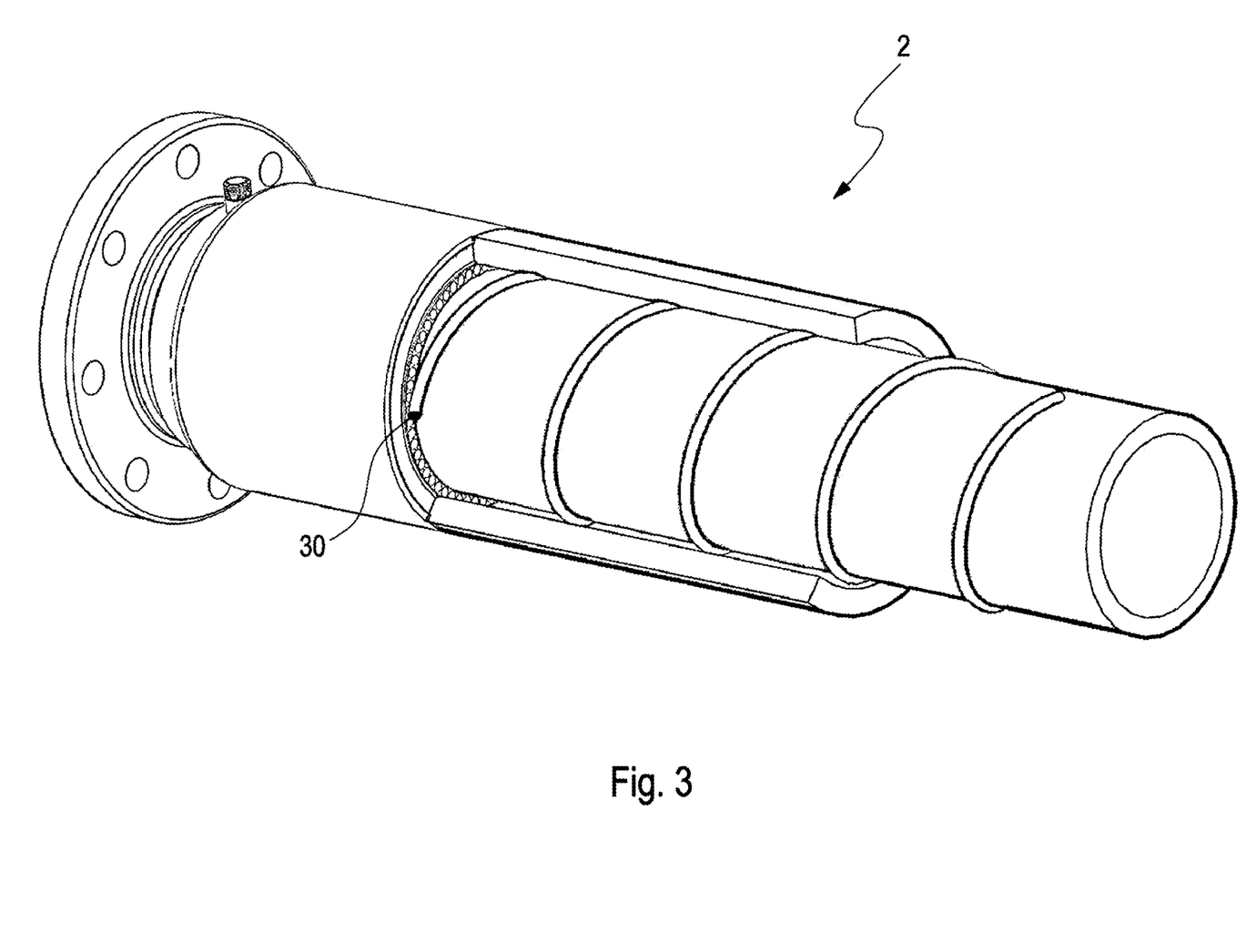
FIG. 3 shows the arrangement of a double-walled hose and a coupling according to FIG. 2 in another perspective, partially cut open view.

FIG. 3 shows the arrangement 2 of double-walled hose 4 and coupling 3 in a different view for improved understanding.

It is to be noted that a single one or a plurality of the features of the presently disclosed detailed embodiment may be used in combination with the generic description of the present disclosure.

What is claimed is:

1. A coupling for a double-walled tube or hose having two coaxially arranged sheaths, the coupling comprising:
   a first inner sleeve surrounding an inner fluid conduit for transfer of a first fluid, wherein the inner fluid conduit is configured to fluidly connect with a first tube or hose fluid conduit formed by a first inner sheath of the tube or hose,
   a second sleeve surrounding the first inner sleeve,
   a third sleeve surrounding the second sleeve,
   a fourth outer sleeve surrounding the third sleeve,
   wherein the first and the second sleeve form a first receiving space for receiving the first inner sheath of an end of the double-walled tube or hose,
   wherein the third and fourth sleeve form a second receiving space for receiving a second outer sheath of the end of the double-walled tube or hose,
   wherein the second and third sleeve form an outer fluid conduit for transfer of a second fluid, wherein the outer fluid conduit is configured to fluidly connect with a second tube or hose fluid conduit formed by a clearance between the first inner sheath and the second outer sheath of the double-walled tube or hose,
   wherein the second and third sleeve are designed as a one-piece part.

2. The coupling according to claim 1, wherein a fluid connector part of the outer fluid conduit is arranged at an angle relative to the axial direction of the coupling and/or the axial direction of the fluid connector part of the inner fluid conduit.

3. The coupling according to claim 2, wherein the fluid connector part of the inner fluid conduit is designed as a front-end fluid connector part comprising a flange part.

4. The coupling according to claim 2, wherein the fluid connector part of the outer fluid conduit is designed as a nozzle fluid connector part or as a socket fluid connector part.

5. The coupling according to claim 2, wherein the outer fluid conduit of the coupling comprises a plurality of fluid channels that are arranged along a circumference of the outer fluid conduit of the coupling and/or that the second and the third sleeve of the coupling are connected to each other by a plurality of web connections.

6. The coupling according to claim 1, wherein a fluid connector part of the inner fluid conduit is designed as a front-end fluid connector part comprising a flange part.

7. The coupling according to claim 6, wherein the fluid connector part of the outer fluid conduit is designed as a nozzle fluid connector part or as a socket fluid connector part.

8. The coupling according to claim 6, wherein the outer fluid conduit of the coupling comprises a plurality of fluid channels that are arranged along a circumference of the outer fluid conduit of the coupling and/or that the second and the third sleeve of the coupling are connected to each other by a plurality of web connections.

9. The coupling according to claim 1, wherein a fluid connector part of the outer fluid conduit is designed as a nozzle fluid connector part and/or as a socket fluid connector part.

10. The coupling according to claim 9, wherein the outer fluid conduit of the coupling comprises a plurality of fluid channels that are arranged along a circumference of the outer fluid conduit of the coupling and/or that the second and the third sleeve of the coupling are connected to each other by a plurality of web connections.

11. The coupling according to claim 1, wherein the outer fluid conduit of the coupling comprises a plurality of fluid channels that are arranged along a circumference of the outer fluid conduit of the coupling and/or that the second and the third sleeve of the coupling are connected to each other by a plurality of web connections.

12. The coupling according to claim 11, wherein a collection channel fluidly connects to a fluid connector part of the outer fluid conduit and/or the plurality of fluid channels of the outer fluid conduit.

13. The coupling according to claim 1, wherein a fluid connector part of the inner fluid conduit of the coupling and a fluid connector part of the outer fluid conduit of the coupling are spaced from each other in an axial direction of the coupling.

14. The coupling according to claim 1, wherein an anti-kink protection device is arranged at least in part in the vicinity of the second and/or third sleeve of the coupling and/or that is designed to be arranged in the clearance between the inner and the outer sheath of the double-walled tube or hose.

15. The coupling according to claim 14, wherein the anti-kink protection device is designed as one, two or a plurality of spirals or springs lying at least in part in the vicinity of and/or extending from the second and/or third sleeve of the coupling.

16. The coupling according to claim 1, wherein the first inner sleeve, the second sleeve, the third sleeve and/or the fourth outer sleeve comprise a latching teeth arrangement.

17. The coupling according to claim 1, comprising at least a crimping device, a clamping device or a swaging device.

18. The coupling according to claim 1, wherein the inner fluid conduit and the outer fluid conduit of the coupling are fluidly separated from each other.

19. The coupling according to claim 1 wherein the first fluid and the second fluid are different types of fluids and/or at a different temperature and/or pressure, and/or wherein the double-walled tube or hose is a safety tube or hose.

20. A double-walled tube or hose arrangement, comprising a double-walled tube or hose and the coupling according to claim 1, wherein the double-walled tube or hose comprises the coupling at least one end of the double-walled tube or hose.

* * * * *

UNITED STATES PATENT AND TRADEMARK OFFICE
CERTIFICATE OF CORRECTION

| | | |
|---|---|---|
| PATENT NO. | : 12,345,364 B2 | Page 1 of 1 |
| APPLICATION NO. | : 18/454294 | |
| DATED | : July 1, 2025 | |
| INVENTOR(S) | : Okan Cebeci et al. | |

It is certified that error appears in the above-identified patent and that said Letters Patent is hereby corrected as shown below:

In the Claims

Column 14, Line 60, Claim 20, after "coupling":
Please add --at--.

Signed and Sealed this
Eighteenth Day of November, 2025

John A. Squires
*Director of the United States Patent and Trademark Office*